United States Patent
Feng et al.

(10) Patent No.: US 9,965,170 B2
(45) Date of Patent: May 8, 2018

(54) MULTI-TOUCH INPUTS FOR INPUT INTERFACE CONTROL

(71) Applicant: Lenovo (Singapore) Pte. Ltd., Singapore (SG)

(72) Inventors: Xin Feng, Arcadia, CA (US); Jeffrey E. Skinner, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 65 days.

(21) Appl. No.: 14/076,772

(22) Filed: Nov. 11, 2013

(65) Prior Publication Data
US 2015/0130724 A1    May 14, 2015

(51) Int. Cl.
*G06F 3/0488*    (2013.01)
*G06F 3/0484*    (2013.01)

(52) U.S. Cl.
CPC ...... *G06F 3/04883* (2013.01); *G06F 3/04845* (2013.01); *G06F 2203/04808* (2013.01)

(58) Field of Classification Search
CPC .......... G06F 3/017; G06F 3/041–3/047; G06F 3/0488–3/04886; G06F 2203/04104; G06K 9/222; G06K 9/00429; G06K 9/00456; G06K 9/6255; G06K 9/6828; G06K 9/72
USPC ......... 345/173–178; 178/18.01–18.09, 18.11
See application file for complete search history.

(56) References Cited

U.S. PATENT DOCUMENTS

| | | | | |
|---|---|---|---|---|
| 5,825,352 A * | 10/1998 | Bisset | ..................... | G06F 3/044 345/157 |
| 7,499,033 B2 * | 3/2009 | Wilde et al. | ................... | 345/173 |
| 2002/0118175 A1 * | 8/2002 | Liebenow et al. | ............. | 345/168 |
| 2003/0227492 A1 * | 12/2003 | Wilde | ................. | G06F 3/04883 715/863 |
| 2008/0036743 A1 * | 2/2008 | Westerman | ............. | G06F 3/038 345/173 |
| 2011/0258537 A1 * | 10/2011 | Rives | .................. | G06F 3/04883 715/255 |
| 2013/0055083 A1 * | 2/2013 | Fino | .............................. | 715/716 |
| 2013/0093664 A1 * | 4/2013 | Nishidate | ....................... | 345/156 |
| 2013/0120267 A1 * | 5/2013 | Pasquero et al. | .............. | 345/168 |
| 2013/0201133 A1 * | 8/2013 | Oh | ................. | 345/173 |
| 2013/0307861 A1 * | 11/2013 | Lang | .................... | G06F 3/04883 345/582 |
| 2014/0078063 A1 * | 3/2014 | Bathiche et al. | .............. | 345/168 |
| 2014/0081620 A1 * | 3/2014 | Solntseva | ......................... | 704/3 |
| 2014/0108992 A1 * | 4/2014 | Bi et al. | ......................... | 715/773 |
| 2014/0267084 A1 * | 9/2014 | Krulce et al. | .................. | 345/173 |

\* cited by examiner

*Primary Examiner* — Stephen Sherman
(74) *Attorney, Agent, or Firm* — Ference & Associates LLC

(57) ABSTRACT

An embodiment provides a method, including: accepting, at a touch input component, touch input; rendering, on a display device, the touch input; determining, using a processor, multi-touch controlling input for controlling the touch input; mapping, using the processor, the multi-touch controlling input to a predetermined control action; and applying the control action to the touch input. Other aspects are described and claimed.

19 Claims, 8 Drawing Sheets

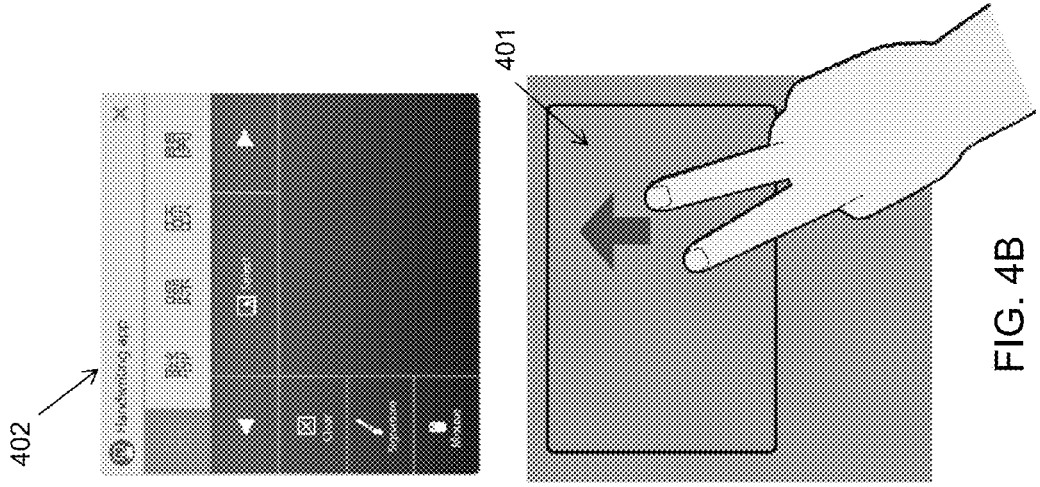
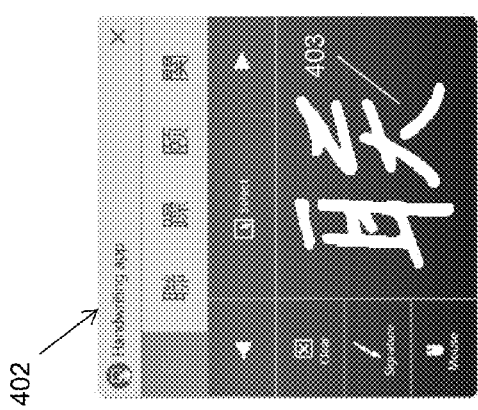
FIG. 4B
FIG. 4A

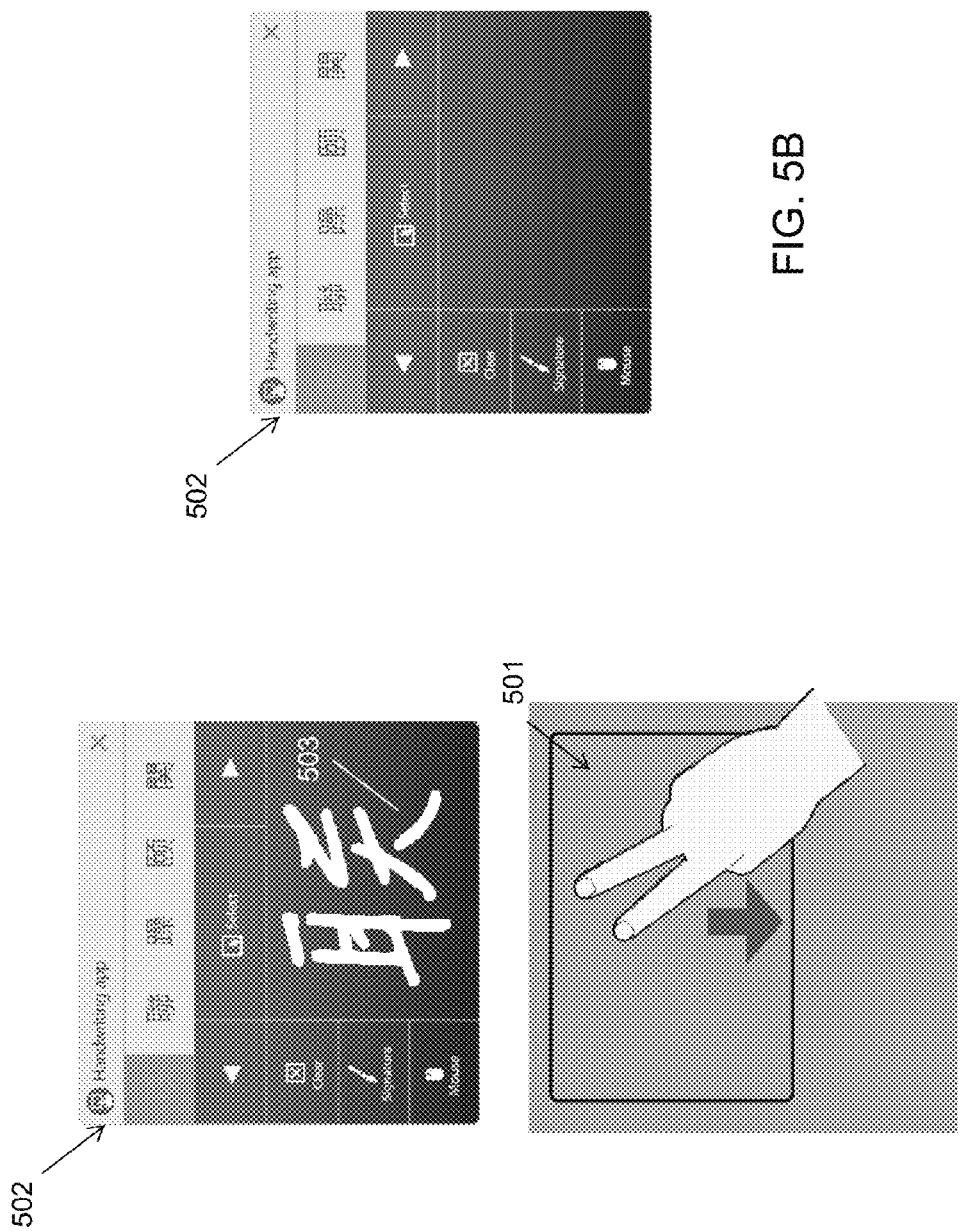

MULTI-TOUCH INPUTS FOR INPUT INTERFACE CONTROL

BACKGROUND

Information handling devices ("devices"), for example laptop computers, tablets, smart phones, e-readers, etc., may be used to accept user inputs in various formats. Among the formats of user inputs currently utilized are drawing inputs and handwriting inputs. Often such inputs are provided for by a user input component, such as a touch screen (for direct input) or digitizer (for indirect or separate input from a display), that accepts the inputs, e.g., as provided by a writing implement such as a pen or stylus or even finger input. Various touch input components require the writing or drawing implement to actually touch the component, while other user input components may not require actual contact.

In conventional touch input interfaces, a user input, e.g., a drawing or handwriting input, is accepted via the input component (e.g., touch pad) and input to an application, e.g., an email application. Depending on the underlying application, the user input provided, e.g., handwriting input, may translated into another format, e.g., machine text for input into the underlying application. For example, a user may provide handwriting input that is converted to machine text for entry into an email application, a word processing application, an Internet search application or web browser, etc.

BRIEF SUMMARY

In summary, one aspect provides a method, comprising: accepting, at a touch input component, touch input; rendering, on a display device, the touch input; determining, using a processor, multi-touch controlling input for controlling the touch input; mapping, using the processor, the multi-touch controlling input to a predetermined control action; and applying the control action to the touch input.

Another aspect provides an information handling device, comprising: a touch input component; a display device; a processor; and a memory device storing instructions executable by the processor to: accept, at the touch input component, touch input; render, on the display device, the touch input; determine multi-touch controlling input for controlling the touch input; map the multi-touch controlling input to a predetermined control action; and apply the control action to the touch input.

A further aspect provides a program product, comprising: a storage medium comprising computer readable program code, the computer readable program code comprising: computer readable program code configured to accept, at a touch input component, touch input; computer readable program code configured to render, on a display device, the touch input; computer readable program code configured to determine, using a processor, multi-touch controlling input for controlling the touch input; computer readable program code configured to map, using the processor, the multi-touch controlling input to a predetermined control action; and computer readable program code configured to apply the control action to the touch input.

A still further aspect provides an information handling device, comprising: a touch input component; a display device; a processor; and a memory device storing instructions executable by the processor to: accept, at the touch input component, touch input; render, on the display device, the touch input; determine a contact area of the touch input for controlling the touch input rendering; and apply the controlling to apply an attribute to the touch input rendering.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates another example of multi-touch controlling input for touch input interface control.

FIG. 5(A-B) illustrates another example of multi-touch controlling input for touch input interface control.

DETAILED DESCRIPTION

Figure 1:
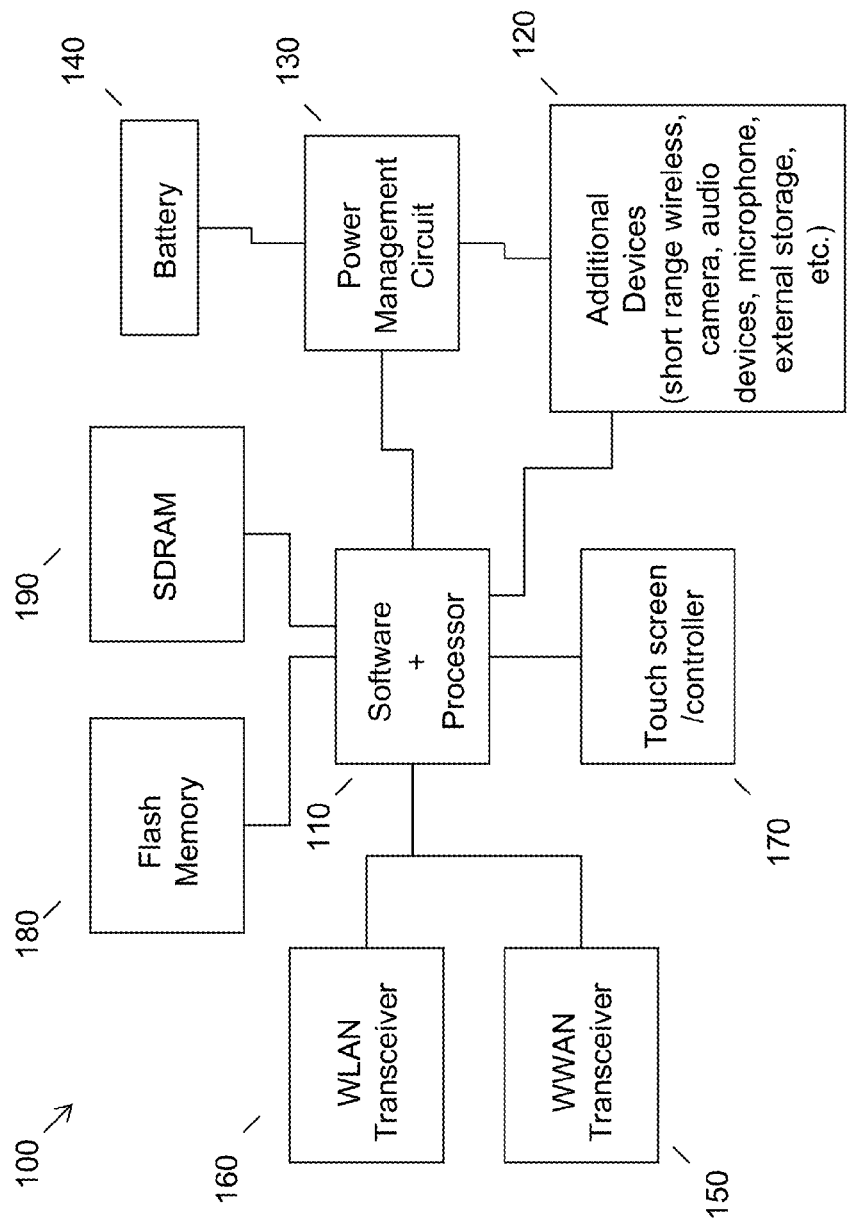
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Handwriting software is increasingly popular, particularly with devices that include a touch screen devices such as smart phones, tablets and devices coupled to a display. In text/image editors, i.e., a user interface that accepts user's handwriting inputs, a user needs to use menu command/icons to perform certain control actions, for example editing or erasing the touch inputs rendered within the touch input interface, e.g., a text image of handwriting, a drawing or symbol, etc. It is inconvenient for the user to be forced to switch back and forth between command modes for controlling the input, editing and removal of content, and a content input mode for creating the touch input renderings. Also, for user interfaces with limited space, it is challenging to accommodate additional icons/menu commands for performing control actions.

Accordingly, an embodiment provides a mechanism by which a user may conveniently provide touch inputs of a predefined nature, e.g., multi-touch inputs, for controlling the touch input interface. Thus, a user may control the operation of the touch input interface conveniently using multi-touch control actions, e.g., to erase touch inputs or portions thereof, enter the touch inputs, e.g., to an underlying application, or remove previously entered touch inputs, e.g., from the touch input interface and/or the underlying application.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a short range wireless communication device, such as a BLUETOOTH radio. Commonly, system 100 will include a touch screen 170 for data input and display, e.g., for accepting handwriting and drawing inputs. System 100 also typically includes various memory devices, for example flash memory 180 and SDRAM 190.

Figure 2:
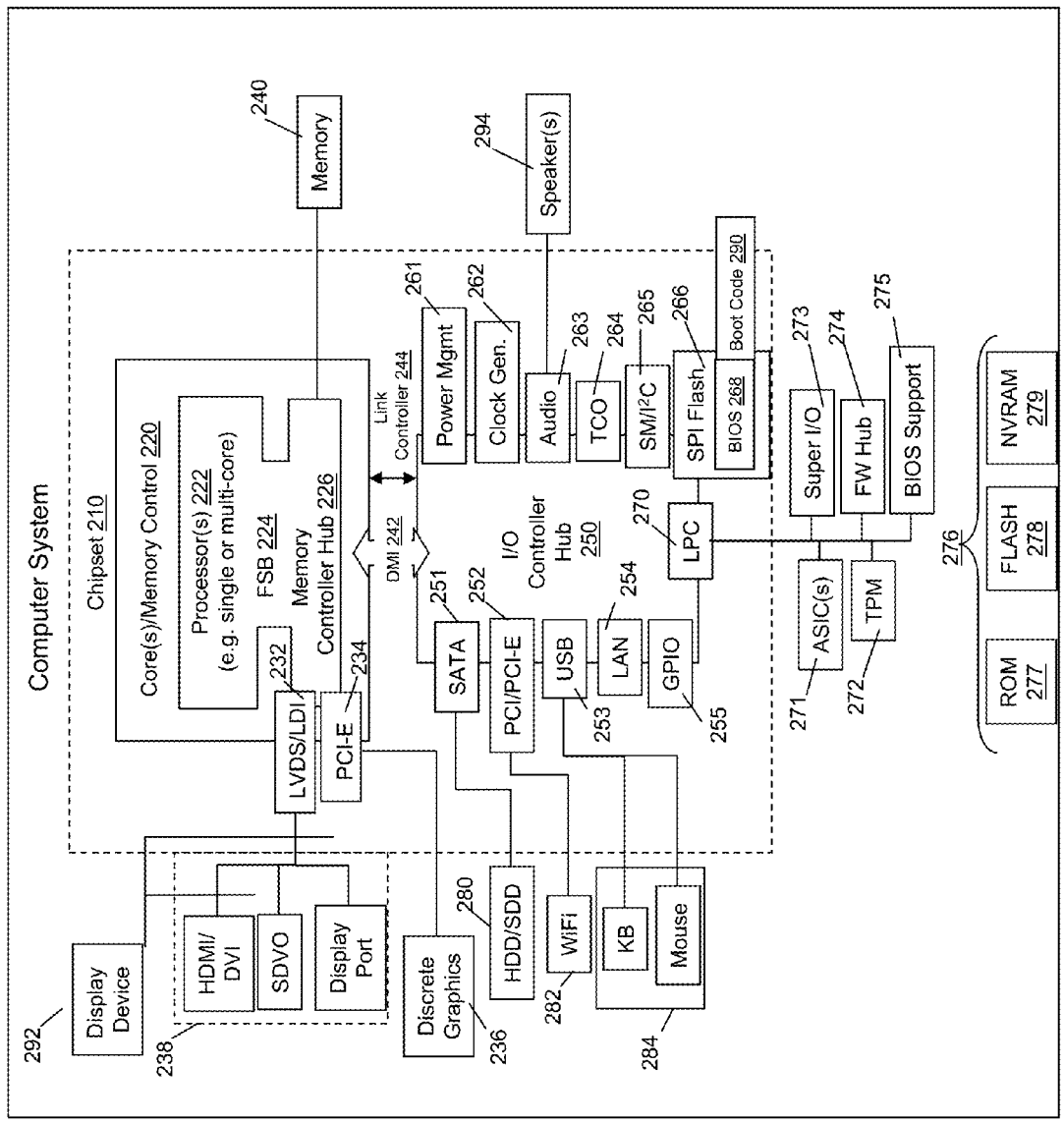
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may used in devices that run applications that accept and render touch inputs, for example handwriting inputs or image/drawing inputs (these terms are used interchangeably herein to refer to inputs to a touch input interface). For example, on a touch input component such as a touch screen, touch pad, digitizer, etc., a user may provide drawing inputs, such as handwritten text and/or drawing in the form of images or symbols. These touch inputs are rendered in a display device within a touch input interface or editor. The touch inputs may thereafter be input into an application, e.g., converting handwriting inputs into text for entry into a word processing application, importing the image input into an email application, etc.

In order to provide seamless and intuitive control of the operation of the touch input interface, various embodiments allow a user to input predetermined multi-touch inputs that are mapped to various control actions. For example, referring to FIG. 3(A-B), a user may provide input into a touch sensitive surface 301, e.g., a touch pad, a touch screen, etc. These inputs are then rendered on a display device, e.g., within a touch input interface 302. The inputs may for example include a handwritten character input 303 (which likewise may equally be an alphanumeric character, a symbol, a drawing or image, etc.).

Figure 3B:
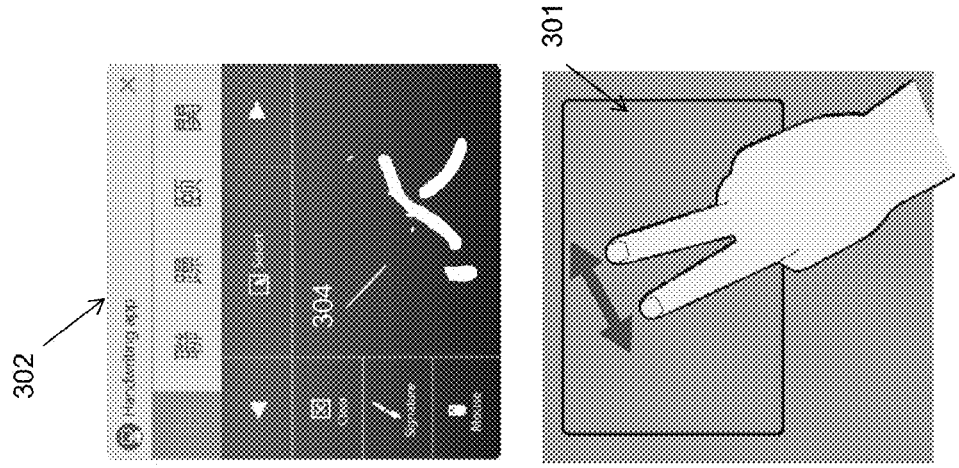
FIG. 3(A-B) illustrates an example of multi-touch controlling input for touch input interface control.
Figure 3A:
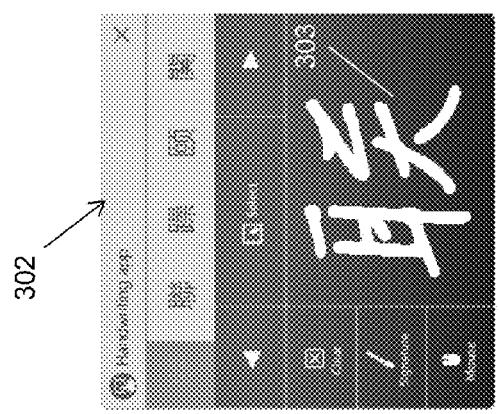

Conventionally, once the input is rendered in a form, e.g., 303, the user must navigate in the touch input interface 302 using controls (e.g., buttons, menu options, etc.) to modify the input character 303. However, according to an embodiment, a user may provide a multi-touch control input to the surface 301, as illustrated in FIG. 3B, such that the touch input interface responds to the multi-touch control input to edit the character 303 automatically. For example, if a user inputs a predetermined multi-touch input in the form a swipe pattern, e.g., back and forth swiping with two fingers as illustrated in FIG. 3B, the character 303 rendered in the touch input interface 302 is modified to the form 304.

That is, an embodiment automatically maps the multi-touch controlling input of the predetermined swiping pattern, e.g., back and forth two finger swiping, to an associated control action, in the example of FIG. 3B an erase action for producing updated character rendering 304. Thus, a user may seamlessly transition to an editing mode for modifying or editing the character 303 to form character 304, where the multi-touch control input of swiping is automatically converted into an erasing action of the portion of the character 303 that is associated with the swiping pattern.

A variety of multi-touch controlling actions may be mapped to corresponding control actions for controlling the touch input interface/editor. For example, referring to FIG. 4(A-B), a user may provide touch input to a surface 301 to have the inputs rendered as a handwritten character 403 within a touch input interface 402. If a user wishes to input the handwritten character, e.g., into an underlying application such as a word processing application or an email application, the user would normally have to provide input to a control button or select from a menu of options.

However, according to an embodiment, a user may provide a multi-touch control input, as illustrated in FIG. 4B, for example a multi-touch swiping input in an upward direction e.g., provided to a surface 401. An embodiment interprets the multi-touch control input, i.e., maps it to, a predetermined control action for the touch input interface 402. In this example, the multi-touch control input of an upward swiping input using two fingers is mapped to an input control action. Thus, the character 403 may be input into an underlying application, e.g., an email application. The character 403 may be input in an image or drawing format (i.e., unmodified), or the input may be input as a machine text converted form of the input, as further described herein.

Similarly, referring to FIG. 5(A-B), a user may provide a multi-touch control input, as illustrated in FIG. 5B, for example a multi-touch swiping input in a downward direction, e.g., provided to a surface 501. An embodiment interprets the multi-touch control input, i.e., maps it to, a predetermined control action. In this example, the multi-touch control input of a downward swiping input using two fingers is mapped to an undo or remove control action. Thus, the character 503 may be undone (e.g., taken out of the touch input interface 502) or removed (e.g., removing a previously input character from an underlying application, e.g., an email application). The character 503 therefore may be undone or erased in total from the touch input interface 502, or the last input may be removed (e.g., machine text converted form of the input removed from the underlying application).

Figure 6B:
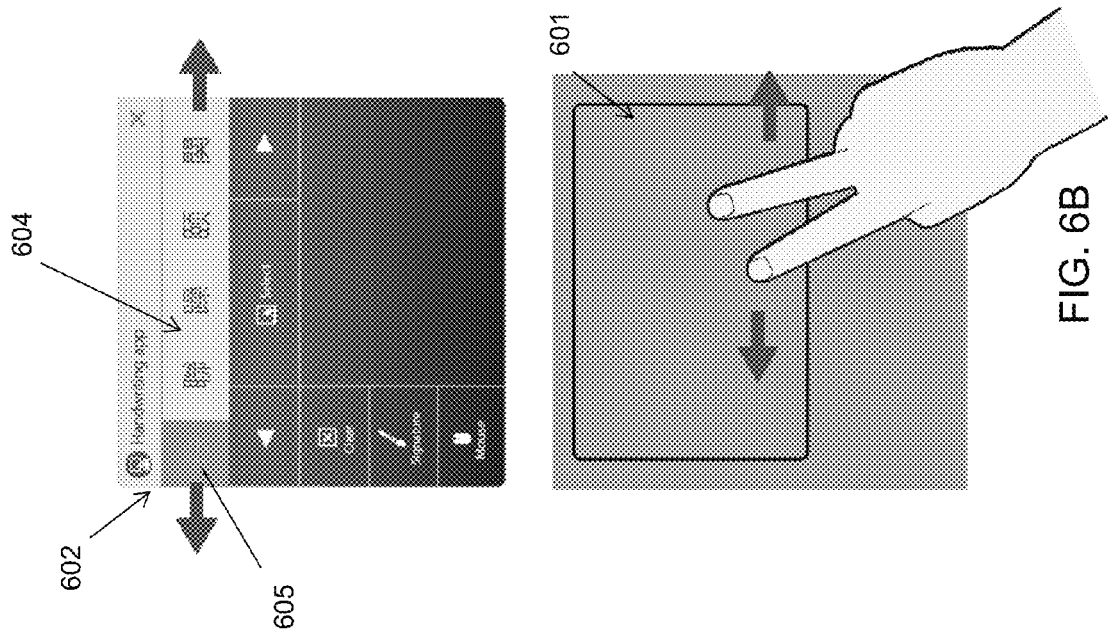
FIG. 6(A-B) illustrates another example of multi-touch controlling input for touch input interface control.
Figure 6A:
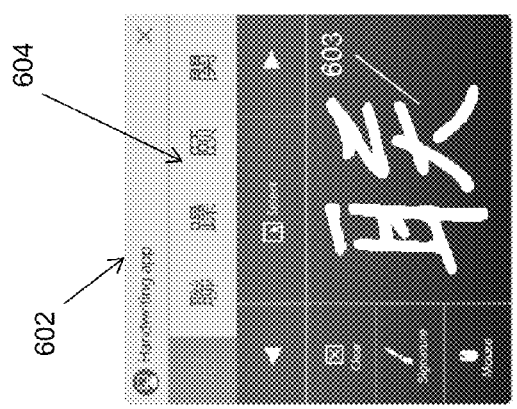

In an embodiment, a multi-touch control action may operate a sub-area or function of the touch input interface. For example, as illustrated in FIG. 6(A-B), a user may input a handwritten character 603, e.g., via a single finger input to a surface 601. The character 603 is thus rendered in the touch input interface 602. The touch input interface may analyze the handwritten character 603 and determine most likely machine text matches for the character, e.g., as provided in a preview panel 604. This allows the user to select from among the characters of the preview panel or sub-area 604, e.g., for input into an underlying application.

According to an embodiment, a multi-touch control input of a two finger lateral swipe (e.g., to the left or right) allows the user to navigate within the panel or sub-area 604 to highlight or select an appropriate character 605 for input. Once selected, the user may input the character into the underlying application using a conventional method, e.g., choosing an input or enter button within the interface 602 (not shown), or may simply provide another multi-touch control input to the interface 602. For example, the user may provide a multi-touch control input of lateral two finger swiping to an input component 601 to select the appropriate machine text, and thereafter provide another multi-touch control input of an upward two finger swipe, as illustrated in FIG. 4B, to input the selected machine text character.

Figure 7:
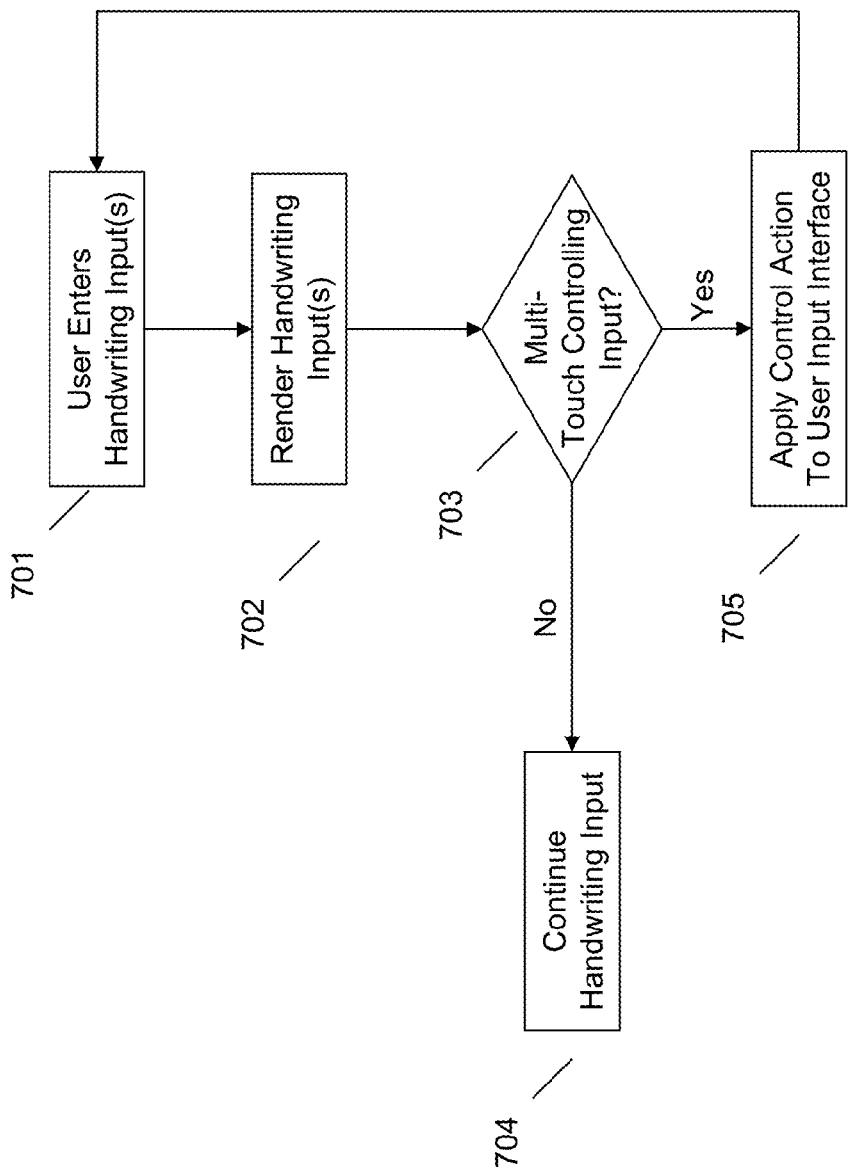
FIG. 7 illustrates an example method of providing multi-touch controlling input for controlling a touch input interface.

Referring to FIG. 7, an embodiment provides a mechanism for controlling a touch input interface using multi-touch controls. The user may provide touch inputs, e.g., handwriting inputs using a finger tip, at 701. These touch inputs may be used to form text or character inputs, drawings or symbols, etc., which are rendered in a display at 702. If a user provides a multi-touch control input, e.g., of the variety described herein, as determined at 703, an embodiment map this multi-touch control input to a predetermined control action for the touch input interface. Therefore, at 705 an embodiment may automatically provide the control action, e.g., erasing a portion of the rendered touch input, inputting the rendered touch input, removing previously supplied touch input, etc., at 705. Otherwise, e.g., if no multi-touch control input is provided, an embodiment may permit the user to continue providing touch input for rendering. Additionally, after the control action has been applied at 705, an embodiment permits a user to continue to supply touch inputs for rendering, as indicated in FIG. 7.

Figure 8B:
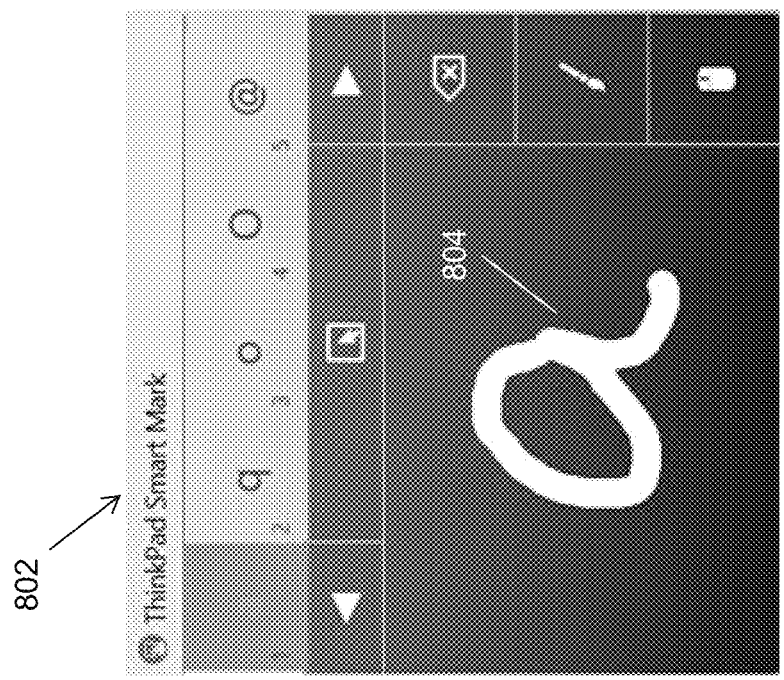
FIG. 8(A-B) illustrates an example of controlling input for a touch input interface control.
Figure 8A:
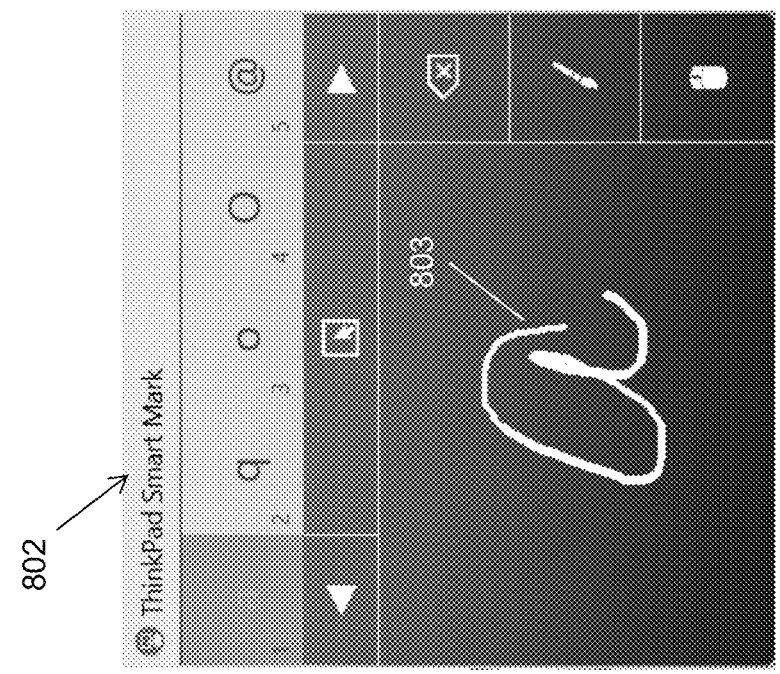

A contact area (e.g., size of finger contact, e.g., width) may be utilized as a controlling input for affecting attributes of the input provided to the touch input interface. For example, referring to FIG. 8(A-B), a smaller contact area (e.g., lighter finger press) provided to the touch input interface 802 may result in a rendering 803 of a certain size (e.g., standard line width) and/or an input of a normal or default font, e.g., into an underlying application, as illustrated in FIG. 8A. In contrast, a larger contact area (e.g., firmer, wider finger press), while having the same recognition result (i.e., the character "A", including previews for machine translation thereof), may yield a thicker line input rendering 804 and/or a bold font input to an underlying application (e.g. word processing application, email application, memo or note application, etc), as illustrated in FIG. 8B. Therefore, an embodiment may utilize a contact area (e.g., width of detected finger press) to implement various control actions affecting an attribute of the input to the touch surface 802.

Various embodiments permit a user to employ intuitive multi-touch controlling actions to operate within a touch input interface. Using these control actions, a user may seamlessly edit, modify, and otherwise control which inputs are provided by the touch input interface, without resorting to use of menu options and controls. This frees up the interface to be less cluttered with control buttons and facilitates in-line or seamless use of touch-based controls for entering, modifying, editing or removing touch inputs, e.g., as used in connection with underlying applications (e.g., word processing applications, email applications, etc.).

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, at a touch input component, single-touch handwritten input;
   detecting, using a processor, multi-touch controlling input for controlling the single-touch handwritten input, the multi-touch controlling input comprising a plurality of touch points, wherein the multi-touch controlling input comprises a single input establishing an editing mode and providing input for editing the single-touch handwritten input, wherein the single-touch handwritten input does not establish the editing mode;
   transitioning, in response to the multi-touch controlling input, into an editing mode;
   mapping, using the processor, the multi-touch controlling input to a predetermined control action; and
   applying the control action automatically, based on the mapping, to the single-touch handwritten input.

2. The method of claim 1, wherein the multi-touch controlling input comprises multi-touch swipe input; and
   the predetermined control action comprises erasing a portion of the single-touch handwritten input associated with the multi-touch swipe input.

3. The method of claim 2, wherein the multi-touch swipe input conforms to a predetermined swipe pattern.

4. The method of claim 3, wherein the predetermined swipe pattern comprises a multi-touch back and forth pattern.

5. The method of claim 1, wherein the multi-touch controlling input comprises multi-touch swipe input; and
   the predetermined control action comprises inputting the single-touch handwritten input into an underlying application.

6. The method of claim 5, wherein the multi-touch swipe input comprises an upward multi-touch swipe input.

7. The method of claim 1, wherein the multi-touch controlling input comprises multi-touch swipe input; and
   the predetermined control action comprises removing previously entered touch input from an underlying application, wherein the multi-touch swipe input comprises a downward multi-touch swipe input.

8. The method of claim 1, wherein the multi-touch controlling input comprises multi-touch swipe input; and
   the predetermined control action comprises scrolling a preview portion within the touch input interface to select a previewed machine text translation of the single-touch handwritten input.

9. The method of claim 8, wherein the multi-touch swipe input comprises a lateral multi-touch swipe input.

10. An information handling device, comprising:
    a touch input component;
    a processor; and a memory device storing instructions executable by the processor to:

accept, at the touch input component, single-touch handwritten input;

detect multi-touch controlling input for controlling the single-touch handwritten input, the multi-touch controlling input comprising a plurality of touch points, wherein the multi-touch controlling input comprises a single input establishing an editing mode and providing input for editing the single-touch handwritten input, wherein the single-touch handwritten input does not establish the editing mode;

transition, in response to the multi-touch controlling input, into an editing mode;

map the multi-touch controlling input to a predetermined control action; and apply the control action automatically, based on the mapping, to the single-touch handwritten input.

11. The information handling device of claim 10, wherein the multi-touch controlling input comprises multi-touch swipe input; and the predetermined control action comprises erasing a portion of the single-touch handwritten input associated with the multi-touch swipe input.

12. The information handling device of claim 11, wherein the multi-touch swipe input conforms to a predetermined swipe pattern.

13. The information handling device of claim 12, wherein the predetermined swipe pattern comprises a multi-touch back and forth pattern.

14. The information handling device of claim 10, wherein the multi-touch controlling input comprises multi-touch swipe input; and the predetermined control action comprises inputting the single-touch handwritten input into an underlying application.

15. The information handling device of claim 14, wherein the multi-touch swipe input comprises an upward multi-touch swipe input.

16. The information handling device of claim 10, wherein the multi-touch controlling input comprises multi-touch swipe input; and the predetermined control action comprises removing previously entered touch input from an underlying application, wherein the multi-touch swipe input comprises a downward multi-touch swipe input.

17. The information handling device of claim 10, wherein the multi-touch controlling input comprises multi-touch swipe input; and the predetermined control action comprises scrolling a the preview portion within the touch input interlace to select a previewed machine text translation of the touch input.

18. The information handling device of claim 17, wherein the multi-touch swipe input comprises a lateral multi-touch swipe input.

19. A program product, comprising:

a storage medium comprising computer readable program code, the computer readable program code comprising:

computer readable program code that accepts, at a touch input component, single-touch handwritten input, wherein the multi-touch controlling input comprises a single input establishing an editing mode and providing input for editing the single-touch handwritten input, wherein the single-touch handwritten input does not establish the editing mode;

computer readable program code that detect, using a processor, multi-touch controlling input for controlling the single-touch handwritten input, the multi-touch controlling input comprising a plurality of touch points;

computer readable program code that transitions, in response to the multi-touch controlling input, into an editing mode;

computer readable program code that maps, using the processor, the multi-touch controlling input to a predetermined control action; and computer readable program code that applies the control action automatically, based on the mapping, to the single-touch handwritten input.

* * * * *